(12) United States Patent
Iijima et al.

(10) Patent No.: US 12,565,188 B2
(45) Date of Patent: Mar. 3, 2026

(54) CONTROL DEVICE FOR HYBRID ELECTRIC VEHICLE

(71) Applicant: TOYOTA JIDOSHA KABUSHIKI KAISHA, Toyota (JP)

(72) Inventors: Masato Iijima, Aichi-ken (JP); Masaki Hayashi, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 18/783,665

(22) Filed: Jul. 25, 2024

(65) Prior Publication Data

US 2025/0115234 A1    Apr. 10, 2025

(30) Foreign Application Priority Data

Oct. 6, 2023    (JP) ................................. 2023-174400

(51) Int. Cl.
*B60W 20/15* (2016.01)
*B60W 10/06* (2006.01)
*B60W 30/14* (2006.01)

(52) U.S. Cl.
CPC ............ *B60W 20/15* (2016.01); *B60W 10/06* (2013.01); *B60W 30/14* (2013.01)

(58) Field of Classification Search
CPC ...... B60W 20/15; B60W 10/06; B60W 30/14; B60W 2510/0642; B60W 2710/065; B60W 20/00; B60W 30/18054; B60K 2006/4816; Y02T 10/62
See application file for complete search history.

(56) References Cited

U.S. PATENT DOCUMENTS

| | | | |
|---|---|---|---|
| 5,893,816 A | 4/1999 | Ashida | |
| 2015/0232101 A1* | 8/2015 | Sasaki ..................... | F16H 63/50 477/54 |
| 2018/0112612 A1* | 4/2018 | Tsunoda .............. | F02D 41/0002 |

FOREIGN PATENT DOCUMENTS

| | | |
|---|---|---|
| JP | H10-115237 A | 5/1998 |
| JP | 2019-034736 A | 3/2019 |

* cited by examiner

*Primary Examiner* — Brian P Sweeney
(74) *Attorney, Agent, or Firm* — SoraIP, Inc.

(57) ABSTRACT

A control device is applied to a hybrid electric vehicle in which an internal combustion engine and a motor generator are provided as a prime mover, and the high-voltage battery is charged using the power of the internal combustion engine and the autonomous operation is performed. The control device executes a process of setting the idle rotation speed of the internal combustion engine while the vehicle is running during the execution of the automatic driving to be higher than the idle rotation speed during the vehicle running during the non-execution of the automatic driving.

3 Claims, 2 Drawing Sheets

FIG. 2

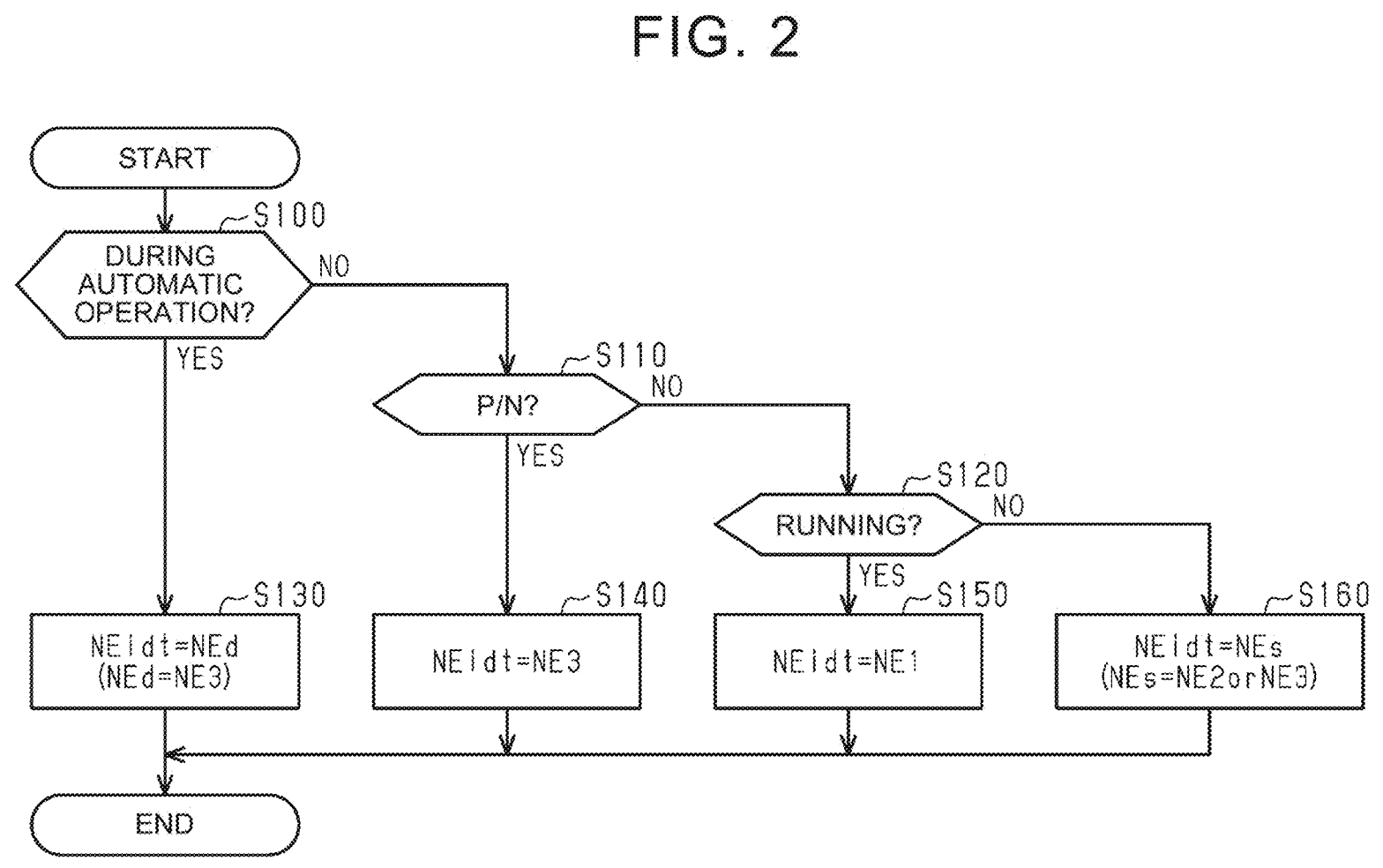

START

S100 DURING AUTOMATIC OPERATION?

NO

S110 P/N?

YES

S120 RUNNING?

YES

NO

S130 NEidt=NEd (NEd=NE3)

S140 NEidt=NE3

S150 NEidt=NE1

S160 NEidt=NEs (NEs=NE2 or NE3)

END

CONTROL DEVICE FOR HYBRID ELECTRIC VEHICLE

CROSS-REFERENCE TO RELATED APPLICATION

This application claims priority to Japanese Patent Application No. 2023-174400 filed on Oct. 6, 2023, incorporated herein by reference in its entirety.

BACKGROUND

1. Technical Field

The present disclosure relates to a control device for a hybrid electric vehicle.

2. Description of Related Art

Japanese Unexamined Patent Application Publication No. 10-115237 (JP 10-115237 A) describes a vehicle in which the idle speed of an internal combustion engine is made different between when the vehicle is traveling and when the vehicle is at a halt, for example.

SUMMARY

There is known a hybrid electric vehicle that includes an internal combustion engine and an electric motor as a prime mover and charges a battery using an output of the internal combustion engine. In this hybrid electric vehicle, if the idle rotation speed of the internal combustion engine is maintained when the vehicle transitions from a stationary state to a traveling state, the vehicle driver may feel the creeping force of the vehicle strong. Therefore, when the vehicle transitions from a stationary state to a traveling state, the creeping force is suppressed by reducing the idle rotation speed of the internal combustion engine. When the idle rotation speed of the internal combustion engine is reduced, however, the output of the internal combustion engine is reduced. Therefore, the amount of charge of the battery charged using the output of the internal combustion engine may become insufficient during travel.

In order to address the above issue, an aspect provides a control device for a hybrid electric vehicle that includes an internal combustion engine and an electric motor as a prime mover, charges a battery using an output of the internal combustion engine, and is subjected to adaptive cruise control. The control device executes a process of rendering an idle rotation speed of the internal combustion engine during vehicle travel during execution of the adaptive cruise control higher than an idle rotation speed during vehicle travel during non-execution of the adaptive cruise control.

The control device for a hybrid electric vehicle can suppress the amount of charge of the battery becoming insufficient during travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a procedure of processing executed by the control device according to the embodiment.

DETAILED DESCRIPTION OF EMBODIMENTS

Configuration of the Vehicle

Figure 1:
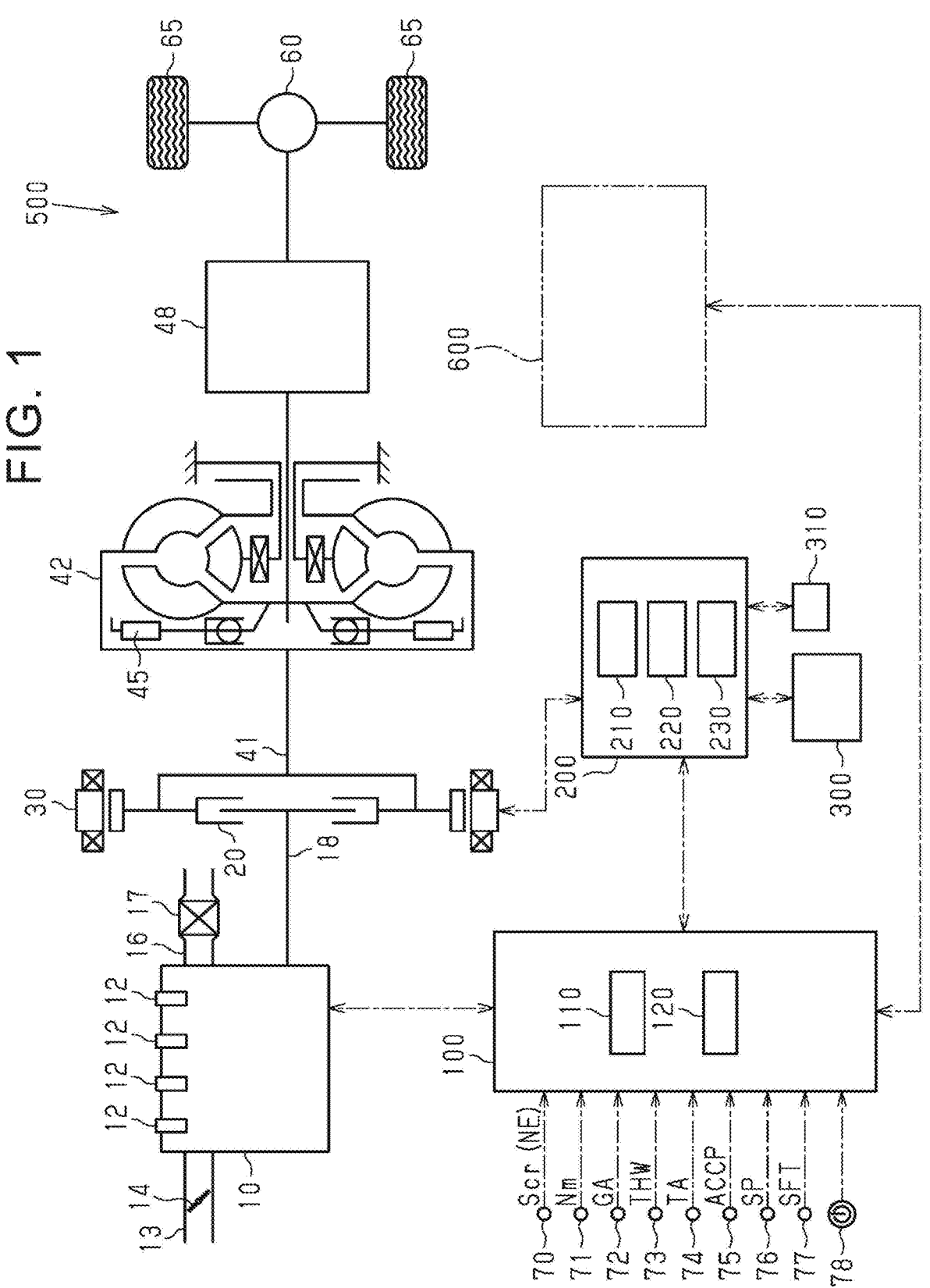
FIG. 1 is a schematic diagram of a vehicle in one embodiment.

Hereinafter, an embodiment of a control device of hybrid electric vehicle will be described referring to FIGS. 1 and 2.

As shown in FIG. 1, a vehicle 500 is a hybrid electric vehicle equipped with two prime movers, such as a motor generator 30 and an internal combustion engine 10, which are electric motors. The motor generator 30 has a function as a generator that generates electric power stored in the high-voltage battery 300 using the output of the internal combustion engine 10, and a function as an electric motor that receives the electric power supplied from the high-voltage battery 300 and outputs driving power. The high-voltage battery 300 is a battery that is charged using the output of the internal combustion engine 10.

The internal combustion engine 10 includes a fuel injection valve 12 that supplies fuel to a cylinder. A throttle valve 14 for adjusting the intake air amount is provided in the intake passage 13 of the internal combustion engine 10. A catalyst 17 for exhaust gas purification is provided in the exhaust passage 16 of the internal combustion engine 10. When the temperature of the catalyst 17 becomes equal to or higher than the activation temperature, the ability to reduce the exhaust gas is increased when the warm-up is completed. In the combustion chamber of the internal combustion engine 10, an engine output is obtained by burning an air-fuel mixture injected from the fuel injection valve 12.

The crankshaft 18 of the internal combustion engine 10 is connected to the output shaft 41 of the motor generator 30 via a clutch mechanism 20.

The clutch mechanism 20 is a mechanism that adjusts a torque transmission amount between the crankshaft 18 and the output shaft 41 of the motor generator 30. When the clutch mechanism 20 is in the engaged state, the crankshaft 18 and the output shaft 41 of the motor generator 30 are connected to each other, while when the clutch mechanism is in the released state, the connection between the crankshaft 18 and the output shaft 41 of the motor generator 30 is released.

The motor generator 30 exchanges electric power with the high-voltage battery 300 for traveling via a Power Control Unit (PCU) 200.

PCU 200 includes a boost converter 210, an inverter 220, a DC-DC converter 230, and the like. The boost converter 210 boosts and outputs the DC voltage input from the high-voltage battery 300. The inverter 220 converts the DC voltage boosted by the boost converter 210 into an AC voltage and outputs the AC voltage to the motor generator 30. DC-DC converters 230 step down the DC voltage of the high-voltage battery 300 to the voltage for driving the auxiliary devices. The stepped-down power is stored in the low-voltage battery 310.

An output shaft 41 of the motor generator 30 is connected to an input shaft of a torque converter 42 having a lock-up clutch 45. An output shaft of the torque converter 42 is connected to an input shaft of the automatic transmission 48. An output shaft of the automatic transmission 48 is connected to the differential gear 60. A drive wheel 65 of the vehicle 500 is connected to an output shaft of the differential gear 60.

The vehicle 500 includes an autonomous driving system 600. The autonomous driving system 600 includes a CPU, a memory in which control programs and data are stored, and various sensors. Then, CPU executes the program stored in the memory to execute the automated driving of the vehicle 500. The autonomous driving system 600 executes autonomous driving and cancels autonomous driving by operating, for example, a button, a touch panel, or the like installed in the vehicle. The autonomous driving system 600 controls a steering system of the vehicle 500, a brake system of the vehicle 500, a prime mover system of the vehicle 500, and the like. The autonomous driving system 600 performs adaptive cruise control known as one of the autonomous driving. The adaptive cruise control is a control for automatically performing acceleration and deceleration of the vehicle within a predetermined vehicle speed, for example, to perform a follow-up running in which the distance between the vehicle and the preceding vehicle is maintained.

The autonomous driving system 600 performs mutual communication with the control device 100. The control device 100 executes various controls such as ignition timing control of the internal combustion engine 10, fuel injection control, and control of the motor generator 30.

The control device 100 includes a CPU 110 and a memory 120 in which control programs and data are stored. The CPU 110 executes the program stored in the memory 120 to execute various kinds of control. Although not shown, the control device 100 includes a plurality of control units such as a control unit for an internal combustion engine and a control unit for a PCU.

A crank angle sensor 70 that detects a rotation angle of the crankshaft 18 and a rotation speed sensor 71 that detects a motor rotation speed Nm that is a rotation speed of the motor generator 30 are connected to the control device 100. The control device 100 is connected with an airflow meter 72 that detects the intake air amount GA of the internal combustion engine 10 and a water temperature sensor 73 that detects a coolant temperature THW that is the temperature of the coolant of the internal combustion engine 10. A throttle sensor 74 that detects a throttle opening degree TA that is an opening degree of the throttle valve 14 and an accelerator position sensor 75 that detects an accelerator operation amount ACCP that is an operation amount of the accelerator pedal are connected to the control device 100. A vehicle speed sensor 76 that detects a vehicle speed SP of the vehicle 500 is connected to the control device 100. Further, the control device 100 is connected with a shift position sensor 77 that detects a shift position SFT that is an operating position of a shift lever of the automatic transmission 48 provided in the vehicle cabin of the vehicle 500. The operating position of the shift lever includes a parking position (P position) and a neutral position (N position) which are non-traveling positions selected when the vehicle 500 is not traveling. Further, the operating position of the shift lever includes a drive position (D position) and a reverse position (R position) which are driving positions selected when the vehicle 500 is driven. Note that a function of a shift lever may be provided to a button, a touch panel, or the like. In addition, the control device 100 recognizes the start request of the system of the vehicle 500 based on the input signal from the power switch 78. The control device 100 calculates the engine rotation speed NE based on Ser of the crank angle sensor 70. Further, the control device 100 calculates the engine load factor KL based on the engine rotation speed NE and the intake air amount GA.

10 PCU 200 is connected to the control device 100, and the control device 100 controls the motor generator 30 through the control of PCU 200.

The control device 100 operates each operation unit of the internal combustion engine 10, such as the throttle valve 14 and the fuel injection valve 12, in order to control the engine output, the exhaust component ratio, and the like, which are the control amounts of the internal combustion engine 10 as a control target. In addition, the control device 100 operates the inverter 220 via PCU 200 in order to control the torque which is the control variable of the motor generator 30 as the control target.

When the internal combustion engine 10 is used as the prime mover of the vehicle 500, the control device 100 sets the clutch mechanism 20 in an engaged state and transmits the output torque of the internal combustion engine 10 to the automatic transmission 48. In some cases, the motor generator 30 also performs a power running operation to transmit not only the output torque of the internal combustion engine 10 but also the power running torque of the motor generator 30 to the automatic transmission 48, thereby performing HV running. On the other hand, when only the motor generator 30 is used as the prime mover of the vehicle 500, the control device 100 shuts off the torque transmission between the internal combustion engine 10 and the automatic transmission 48 by setting the clutch mechanism 20 to the released state. Then, by operating the motor generator 30 to perform a power running operation, the power running torque of the motor generator 30 is transmitted to the automatic transmission 48, and EV traveling is performed. In addition, when the high-voltage battery 300 is charged using the output of the internal combustion engine 10, the control device 100 performs engine travel by bringing the clutch mechanism 20 into an engaged state and transmitting the output torque of the internal combustion engine 10 to the motor generator 30 and the automatic transmission 48.

The control device 100 performs the idle operation control of the internal combustion engine 10 when the accelerator operation quantity ACCP is "0" and the engine operation is requested. In the idle operation control, a target idle rotation speed NEidt is calculated. Then, the engine operation is performed such that the idle rotation speed NEid, which is the engine rotation speed NE during the idle operation, coincides with the target idle rotation speed NEidt. Examples of the engine operation request include a request for charging the high-voltage battery 300 and a request for driving an auxiliary machine provided in the internal combustion engine 10.

Setting the Target Idle Speed

FIG. 2 shows a process sequence for setting the target idle rotation speed NEidt to be executed when the idle operation control is performed. Note that the processing illustrated in FIG. 2 is repeatedly executed at a predetermined cycle when the execution of the idle operation control is requested. In the following description, the step number is represented by a number having "S" at the beginning.

When the process illustrated in FIG. 2 is started, the control device 100 determines whether or not autonomous driving is being performed (S100). When it is determined that the vehicle is in the automated driving state (S100: YES), the control device 100 substitutes the fixed rotation speed NEd into the target idle rotation speed NEidt (S130). The fixed rotation speed NEd is the same as the third rotation speed NE3 described later. During autonomous driving, the fixed rotation speed NEd is substituted as the target idle rotation speed NEidt both during stopping and during traveling of the vehicle.

When the fixed rotation speed NEd is substituted into the target idle rotation speed NEidt in S130 process, the control device 100 performs engine operation so that the idle rotation speed NEid coincides with the fixed rotation speed NEd.

In S100 process, when it is determined that the autonomous driving is not being performed and the autonomous driving is not being performed (S100: NO), the control device 100 determines whether or not the present shift position SFT is the P position or the N position (S110). When it is determined that the shift position SFT is the P position or the N position (S110: YES), the control device 100 substitutes the third rotation speed NE3 for the target idle rotation speed NEidt (S140). The third rotation speed NE3 is a rotation speed set when the high-voltage battery 300 is required to be charged, and the rotation speed is the highest among the idle rotation speed NEid set to be variable.

When the third rotation speed NE3 is substituted into the target idle rotation speed NEidt in S140 process, the control device 100 performs engine operation such that the idle rotation speed NEid coincides with the third rotation speed NE3.

In S110 process, when it is determined that the shift position SFT is not the P position or the N position (S110: NO), the control device 100 determines whether or not the vehicle 500 is traveling based on the vehicle speed SP or the like (S120). When it is determined that the vehicle is traveling (S120: YES), the control device 100 substitutes the first rotation speed NE1 for the target idle rotation speed NEidt (S150).

The first rotation speed NE1 is a rotation speed that is set so as not to excessively increase the creeping force during traveling of the vehicle 500, and the rotation speed is the slowest among the idle rotation speeds NEid that are variable. When the first rotation speed NE1 is substituted into the target idle rotation speed NEidt in S150 process, the control device 100 performs engine operation such that the idle rotation speed NEid coincides with the first rotation speed NE1.

In S120 process, when it is determined that the vehicle is not traveling (S120: NO), that is, when the vehicle is stopping, the control device 100 substitutes either the third rotation speed NE3 or the second rotation speed NE2 into the target idle rotation speed NEidt (S160). The second rotation speed NE2 is a predetermined value, and is a rotation speed between the first rotation speed NE1 and the third rotation speed NE3 described above.

When the high-voltage battery 300 is requested to be charged, in S160 process, the control device 100 substitutes the third rotation speed NE3 into the target idle rotation speed NEidt. When the high-voltage battery 300 is not required to be charged, the control device 100 substitutes the second rotation speed NE2 into the target idle rotation speed NEidt in S160 process.

When the second rotation speed NE2 is substituted into the target idle rotation speed NEidt by S160 process, the control device 100 performs engine operation such that the idle rotation speed NEid coincides with the second rotation speed NE2. Further, when the third rotation speed NE3 is substituted into the target idle rotation speed NEidt by S160 process, the control device 100 performs the engine operation so that the idle rotation speed NEid coincides with the third rotation speed NE3. The selection of the third rotation speed NE3 or the second rotation speed NE2 in S160 process may be performed according to other parameters, such as shifting position SFT.

Operation and Effect of the Present Embodiment

Then, when any one of the processes of S130, S140, S150 and S160 is executed, the control device 100 ends the execution of this process in the current cycle.

(1) During the execution of the automatic driving including the adaptive cruise control, since the speed of the vehicle 500 is automatically controlled without the vehicle driver operating the accelerator, the vehicle driver is less likely to feel the strength of the creep force. In this regard, in the present embodiment, S130 process is executed while the vehicle is running during the autonomous driving, whereby the fixed rotation speed NEd is substituted for the target idle rotation speed NEidt. On the other hand, S150 process is executed while the vehicle is running while the autonomous driving is not being performed, whereby the first rotation speed NE1 whose speed is slower than the fixed rotation speed NEd is substituted into the target idle rotation speed NEidt. Therefore, during the vehicle running during the execution of the automatic driving, the idle rotation speed NEid of the internal combustion engine 10 is higher than during the vehicle running during the non-execution of the automatic driving. Therefore, it is possible to suppress insufficient charge of the high-voltage battery 300 during traveling.

(2) Since it is possible to suppress insufficient charge of the high-voltage battery 300, it is possible to extend the running-time of EV running using the electric power stored in the high-voltage battery 300.

(3) During the autonomous driving, the process of S130 is executed. Therefore, during autonomous driving, the idle rotation speed NEid during stopping and traveling of the vehicle is set to the same rotation speed. Therefore, during the autonomous driving, the idle rotation speed NEid does not change during the stopping and the traveling, so that it is possible to suppress the uncomfortable feeling that the change in the idle rotation speed NEid gives to the vehicle occupant.

Example of Change

The above-described embodiment can be modified as follows. The above-described embodiments and the following modifications can be implemented in combination with each other as long as they are not technically contradictory.

In the above-described embodiment, the idle rotation speed NEid during stopping and traveling of the vehicle during the execution of the automated driving is set to the same rotation speed. In addition, during the execution of the automated driving, the idle rotation speed NEid during the stop and the traveling of the vehicle may be different. Even in this case, it is possible to obtain an action and an effect other than the above (3).

In S130 process, a speed higher than at least the first rotation speed NE1 may be set as the fixed rotation speed NEd to be substituted for the target idle rotation speed NEidt.

The idle rotation speed NEid set during the execution of the automated driving may be set to a speed higher than the idle rotation speed NEid set during the non-execution of the automated driving and during the stop. That is, in the process of S130 illustrated in FIG. 2, the rotation speed higher than the third rotation speed NE3 may be substituted into the target idle rotation speed NEidt. In this case, the idle rotation speed NEid set during the execution of the automated driving is higher than the idle rotation speed NEid set during the non-execution of the automated driving and during the stop. Therefore, insufficient charge of the high-voltage battery 300 can be suppressed more reliably.

The vehicle 500 may be a vehicle that performs at least adaptive cruise control as automated driving.

The hybrid system of the vehicle 500 is not limited to the one shown in FIG. 1, and may be another hybrid system. For example, a so-called series-parallel hybrid system may be employed in which the clutch mechanism 20 is not provided and the crankshaft 18 and the motor generator 30 are connected via a power split mechanism.

The number of motor generators included in the vehicle 500 can be changed as appropriate.

What is claimed is:

1. A control device for a hybrid electric vehicle that includes an internal combustion engine and an electric motor as a prime mover, charges a battery using an output of the internal combustion engine, and is subjected to adaptive cruise control, wherein the control device executes a process of rendering an idle rotation speed of the internal combustion engine during vehicle travel during execution of the adaptive cruise control higher than an idle rotation speed during vehicle travel during non-execution of the adaptive cruise control.

2. The control device according to claim 1, wherein an idle rotation speed during a halt and the idle rotation speed during vehicle travel during execution of the adaptive cruise control are set to the same rotation speed.

3. The control device according to claim 2, wherein the idle rotation speed set during execution of the adaptive cruise control is higher than an idle rotation speed set during non-execution of the adaptive cruise control and during a halt.

* * * * *